US011805740B2

(12) United States Patent
Periard Larrivee et al.

(10) Patent No.: US 11,805,740 B2
(45) Date of Patent: Nov. 7, 2023

(54) SYSTEMS AND METHODS FOR MONITORING AND CONTROLLING CROP IRRIGATION SCHEDULES

(71) Applicant: HORTAU INC., Levis (CA)

(72) Inventors: Yann Periard Larrivee, Saint-Luc-de-Bellechasse (CA); Vincent Pelletier, Sainte-Henedine (CA)

(73) Assignee: HORTAU INC., Levis (CA)

( * ) Notice: Subject to any disclaimer, the term of this patent is extended or adjusted under 35 U.S.C. 154(b) by 45 days.

(21) Appl. No.: 17/762,605

(22) PCT Filed: Sep. 25, 2020

(86) PCT No.: PCT/CA2020/051283
§ 371 (c)(1),
(2) Date: Mar. 22, 2022

(87) PCT Pub. No.: WO2021/056114
PCT Pub. Date: Apr. 1, 2021

(65) Prior Publication Data
US 2022/0394943 A1 Dec. 15, 2022

Related U.S. Application Data

(60) Provisional application No. 62/906,871, filed on Sep. 27, 2019.

(51) Int. Cl.
*A01G 25/16* (2006.01)
*G05B 19/042* (2006.01)
(52) U.S. Cl.
CPC ......... *A01G 25/165* (2013.01); *A01G 25/167* (2013.01); *G05B 19/042* (2013.01); *G05B 2219/2625* (2013.01)

(58) Field of Classification Search
CPC ...... A01G 25/165; A01G 25/167; A01G 7/00; G05B 19/042; G05B 2219/2625
See application file for complete search history.

(56) References Cited

U.S. PATENT DOCUMENTS

| 6,453,216 B1 | 9/2002 | McCabe et al. |
| 2016/0255763 A1 | 9/2016 | Canyon |
| 2020/0359583 A1 * | 11/2020 | Buss ............... A01G 25/167 |

FOREIGN PATENT DOCUMENTS

| WO | 9506881 A1 | 3/1995 |
| WO | 200146681 A1 | 6/2001 |

(Continued)

OTHER PUBLICATIONS

International Search Report of International Application No. PCT/CA2020/051283; Search dated Dec. 24, 2020; Authorized Officer: Torrin Lemire.

*Primary Examiner* — Chad G Erdman
(74) *Attorney, Agent, or Firm* — BCF LLP

(57) ABSTRACT

There is disclosed a method and system for regulating plant irrigation at a crop field. The method comprises obtaining soil water tension (SWT) data and/or soil water content (SWC) data corresponding to a crop field. The SWT data and/or the SWC data is segmented into three segments. A respective line of best fit is determined for each of the three segments. The intercepts of the lines of best fit are used to determine an irrigation start threshold and an irrigation stop threshold. Devices that control irrigation for the crop field are caused to start or stop irrigation based on the irrigation start threshold and irrigation stop threshold.

23 Claims, 14 Drawing Sheets

(56) References Cited

FOREIGN PATENT DOCUMENTS

WO         201831911 A1    2/2018
WO         201936744 A1    2/2019

\* cited by examiner

SYSTEMS AND METHODS FOR MONITORING AND CONTROLLING CROP IRRIGATION SCHEDULES

CROSS-REFERENCE TO RELATED APPLICATIONS

This application is a national phase filing under 35 U.S.C. 371 of International Application No. PCT/CA2020/051283 filed on Sep. 25, 2020, which claims the benefit of U.S. Provisional Application No. 62/906,871, filed on Sep. 27, 2019, the disclosure of both of which is incorporated herein by reference in its entirety.

FIELD OF TECHNOLOGY

Embodiments described herein relate generally to systems and methods for monitoring and controlling crop irrigation, and more particularly, to systems and methods for facilitating data-driven controlling of crop irrigation scheduling.

BACKGROUND

Improved human nutrition can be achieved through improved horticultural productivity and quality, which in turn is often related to irrigation practices. A common practice for determining the need for irrigation of a crop field is to rely on the measurement of soil water tension (SWT), which is the force necessary for the plant roots to extract water from the soil. In addition, SWT can be closely related to the stress experienced by plant tissues. By using the ideal SWT and adjusting irrigation duration and amount, it is possible to simultaneously achieve high productivity of plants while meeting environmental stewardship goals for water use. Measurements of SWT can be particularly useful when soils are very uniform over large geographic expanses or in nursery container substrates. However, as soil nature can vary widely and crops respond differently to SWT, human assumptions, interpretations and adjustments are required to determine when irrigation should commence or end. It is desirable to eliminate the need for such human interventions while ensuring that the irrigation is precisely and efficiently adjusted to the soil and crop specifics at any given location.

SUMMARY

It is an object of the present disclosure to develop methods and systems for crop irrigation scheduling which address at least some of the problems noted above. Developers have noted that real-time analysis of certain parameters relating to soil condition and/or stress factors for crops, such as soil water tension (SWT), soil water content (SWC) or soil salinity, may enable the definition of precise and efficient base irrigation schedules.

The following summary is for illustrative purposes only, and is not intended to limit or constrain the detailed description. The following summary merely presents various described aspects in a simplified form as a prelude to the more detailed description provided below.

Sensors may be placed in a crop field for continuous measurement of various environmental factors affecting the field. The collected data can include a variety of measurements, such as data relating to soil of the crop field (such as soil water tension, osmotic potential, soil nitrate levels, soil temperature, soil water content), air (such as air temperature, relative humidity, wind speed and direction, atmospheric pressure, leaf wetness, solar radiation, and rainfall), living species (such as spore quantification, insect quantification, foraging bee activity), and irrigation water (such as amount of irrigation water, irrigation water temperature, pH, salinity, nitrate content, fertilizer content).

The data, which may be collected continuously and/or in real-time may be used to determine when irrigation should be started, stopped, and/or where irrigation should occur. Various thresholds may be determined for starting and/or stopping irrigation. An irrigation start threshold and/or an irrigation stop threshold may be determined, for example, for a field using soil water tension (SWT) data and/or soil water content (SWC) collected by one or more sensors located in the field. The irrigation start threshold may indicate an SWT which, once reached, triggers irrigation to start. The irrigation stop threshold may indicate an SWT which, once reached, triggers irrigation to stop. An irrigation start threshold and/or an irrigation stop threshold may also be determined using SWC.

An irrigation start threshold may also be determined based on real-time data from more than one data source in a given zone, for example by simultaneously analyzing SWT measured by tensiometers and SWC measured by probes installed at different depths and spaced laterally in the root zone, to calculate the hydraulic conductivity and the vertical and lateral water flows. Real-time data from a spatially distributed network of probes can also be complemented with soil maps, a normalized difference vegetation index (NDVI) or any other spatialized complementary information, to determine the optimal irrigation start threshold and/or the optimal irrigation stop threshold for a given field or area.

The irrigation start and/or stop thresholds may be determined by monitoring SWT and/or SWC of a field over a period of time. By smoothing the monitored raw data, three main segments may be obtained following a watering event (i.e. rain and/or irrigation). A first segment represents the section of fast drainage. A second segment represents the "ideal" section where water and air are available in the root zone. A third segment represents the section where water availability is no longer sufficient to meet the demands of the roots. For each of the segments, a line of best fit may be calculated. The intercept of a line of best fit for a first segment and a line of best fit for a second segment may be used as the irrigation stop threshold. The intercept of a line of best fit for a second segment and a line of best fit for a third segment may be used as the irrigation start threshold.

The determination of irrigation start and/or stop thresholds may be improved or optimized by also taking into account, through an algorithm, time series data for other monitored parameters such as SWC, soil salinity or measures of ionic concentrations for species such as phosphates and nitrates.

After determining an irrigation start threshold and/or an irrigation stop threshold, controllable irrigation devices may be instructed to start and/or stop irrigation based on the thresholds.

According to a first broad aspect of the present technology, there is provided a system for regulating plant irrigation at a crop field. The system is communicatively couplable to: one or more monitoring sensors for monitoring hydrodynamic conditions at the given crop field, and one or more controllable devices that are operable to irrigate the given crop field. The system comprises: at least one processor, and memory storing a plurality of executable instructions. The plurality of executable instructions, when executed by the at least one processor, cause the system to: retrieve SWT data and/or SWC data, corresponding to the crop field, recorded by the one or more monitoring sensors; segment the SWT data in three segments; determine, for each of the three segments, a respective line of best fit; determine a first intercept between the first line of best fit for the first segment and the second line of best fit for the second segment; determine a second intercept between the second line of best fit for the second segment and the third line of best fit for the third segment; store the first intercept as an irrigation stop threshold representative of a desired irrigation end point; store the second intercept as an irrigation start threshold representative of a desired irrigation commencement point; and monitor SWT data and/or SWC data received from the one or more monitoring sensors, and: in response to a determination that the SWT and/or SWC has reached the irrigation start threshold, cause the one or more controllable devices to commence or increase irrigation of the crop field; and in response to a determination that the SWT and/or SWC has reached the irrigation stop threshold, cause the one or more controllable devices to stop or reduce irrigation of the crop field.

In some implementations of the system, the plurality of executable instructions, when executed by the at least one processor, further cause the system to smooth the SWT data and/or SWC data after retrieving the SWT data and/or SWC.

In some implementations of the system, the plurality of executable instructions, when executed by the at least one processor, further cause the system to determine a derivative of the line of best fit for the first segment, the line of best fit for the second segment, and the line of best fit for the third segment.

In some implementations of the system, the plurality of executable instructions, when executed by the at least one processor, further cause the system to: determine, by comparing average SWT and/or SWC during daytime periods to average SWT and/or SWC during nighttime periods, a second irrigation start threshold; and determine an average of the irrigation start threshold and the second irrigation start threshold.

In some implementations of the system, the one or more monitoring sensors comprise one or more tensiometers.

In some implementations of the system, the first segment occurs before the second segment, and the second segment occurs before the third segment.

In some implementations of the system, the tensiometer is configured to measure soil water tension up to one or more of: about 1500 kPa, about 2000 kPa, more than about 2000 kPa, and up to about 20,000 kPa.

In some implementations of the system, the one or more monitoring sensors comprise a plurality of tensiometers arranged to measure soil water tension at different locations in the crop field.

In some implementations of the system, the monitoring the SWT data and/or SWC is in real-time.

In some implementations of the system, the segmenting the SWT data and/or SWC data in three segments comprises segmenting the SWT data and/or SWC data based on watering events. In certain embodiments, a time of a given watering event defines a start time or a stop time of a given segment.

In some implementations, there are less than or more than three segments of the SWT data.

According to another broad aspect of the present technology, there is provided a method comprising: retrieving soil water tension (SWT) data and/or soil water content (SWC) data corresponding to a crop field, (or any other characteristic data such as soil moisture), wherein the SWT data and/or SWC data was recorded by one or more monitoring sensors; segmenting the SWT data and/or SWC data into three segments; determining, for each of the three segments, a respective line of best fit; determining a first intercept between the line of best fit for the first segment and the line of best fit for the second segment; determining a second intercept between the line of best fit for the second segment and the line of best fit for the third segment; storing the first intercept as an irrigation stop threshold representative of a desired irrigation end point; storing the second intercept as an irrigation start threshold representative of a desired irrigation commencement point; and monitoring SWT data and/or SWC data received from the one or more monitoring sensors, and: in response to a determination that the SWT and/or SWC has reached the irrigation start threshold, causing the one or more controllable devices to commence or increase irrigation of the crop field, and in response to a determination that the SWT and/or SWC has reached the irrigation stop threshold, causing the one or more controllable devices to stop or reduce irrigation of the crop field.

In some implementations of the method, the method further comprises smoothing the SWT data and/or SWC.

In some implementations of the method, the method further comprises determining a derivative of the line of best fit for the first segment, the line of best fit for the second segment, and the line of best fit for the third segment.

In some implementations of the method, the method further comprises: determining, by comparing average SWT and/or SWC during daytime periods to average SWT and/or SWC during nighttime periods, a second irrigation start threshold; and determining an average of the irrigation start threshold and the second irrigation start threshold.

In some implementations of the method the one or more monitoring sensors comprise one or more tensiometers.

In some implementations of the method, one or more sensors or probes of another type may be used. These one or more other sensors or probes may be used in combination with one or more tensiometers.

In some implementations of the method the first segment occurs before the second segment, and the second segment occurs before the third segment.

In some implementations of the method, the tensiometer is configured to measure soil water tension up to one or more of: 1500 kPa, 2000 kPa, more than 2000 kPa, and up to 20,000 kPa.

In some implementations of the method, the one or more monitoring sensors comprise a plurality of tensiometers arranged to measure soil water tension at different locations in the crop field.

In some implementations of the method, the monitoring of the SWT data and/or SWC data is in real-time.

In some implementations of the method, the segmenting of the SWT data and/or SWC in three segments comprises segmenting the SWT data and/or SWC based on watering events. In certain embodiments, a time of a given watering event defines either a start time or a stop time of a segment.

In some implementations, there are more than three segments of the SWT data and/or SWC.

From another aspect, there is provided a method for determining an irrigation stop threshold of a crop field, the method comprising: retrieving soil water tension (SWT) data and/or SWC data corresponding to the crop field, wherein the SWT data and/or SWC data was obtained by one or more monitoring sensors; segmenting the SWT data and/or SWC data into three segments; determining, for each of the three segments, a respective line of best fit; determining a first intercept between the line of best fit for the first segment and the line of best fit for the second segment; and storing the first intercept as an irrigation stop threshold representative of a desired irrigation end point.

From a yet further aspect, there is provided a method for determining an irrigation start threshold of a crop field, the method comprising: retrieving soil water tension (SWT) data and/or SWC data corresponding to the crop field, wherein the SWT data and/or SWC data was obtained by one or more monitoring sensors; segmenting the SWT data and/or SWC data into three segments; determining, for each of the three segments, a respective line of best fit; determining a second intercept between the line of best fit for the second segment and the line of best fit for the third segment; and storing the second intercept as an irrigation start threshold representative of a desired irrigation commencement point.

From another aspect, there is provided a system for regulating plant irrigation at a crop field, the system comprising: one or more monitoring sensors for obtaining soil water tension (SWT) data and/or SWC data at the crop field over time; at least one processor communicatively couplable to the one or more monitoring sensors; a memory, communicatively couplable to the at least one processor, for storing a plurality of executable instructions which, when executed by the at least one processor, cause the processor to: segment the SWT data and/or SWC data into three segments; determine, for each of the three segments, a respective line of best fit; determine a first intercept between the line of best fit for the first segment and the line of best fit for the second segment; and store the first intercept as an irrigation stop threshold representative of a desired irrigation end point.

From a yet further aspect, there is provided a system for regulating plant irrigation at a crop field, the system comprising: one or more monitoring sensors for obtaining soil water tension (SWT) data and/or soil water content (SWC) data at the crop field over time; at least one processor communicatively couplable to the one or more monitoring sensors; a memory, communicatively couplable to the at least one processor, for storing a plurality of executable instructions which, when executed by the at least one processor, cause the processor to: segment the SWT data and/or SWC data into three segments; determine, for each of the three segments, a respective line of best fit; determine a second intercept between the line of best fit for the second segment and the line of best fit for the third segment; and store the second intercept as an irrigation start threshold representative of a desired irrigation commencement point.

In the context of the present specification, unless expressly provided otherwise, a computing device and/or computer system may refer, but is not limited to, an "electronic device," an "operation system," a "system," a "computer-based system," a "controller unit," a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object might not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
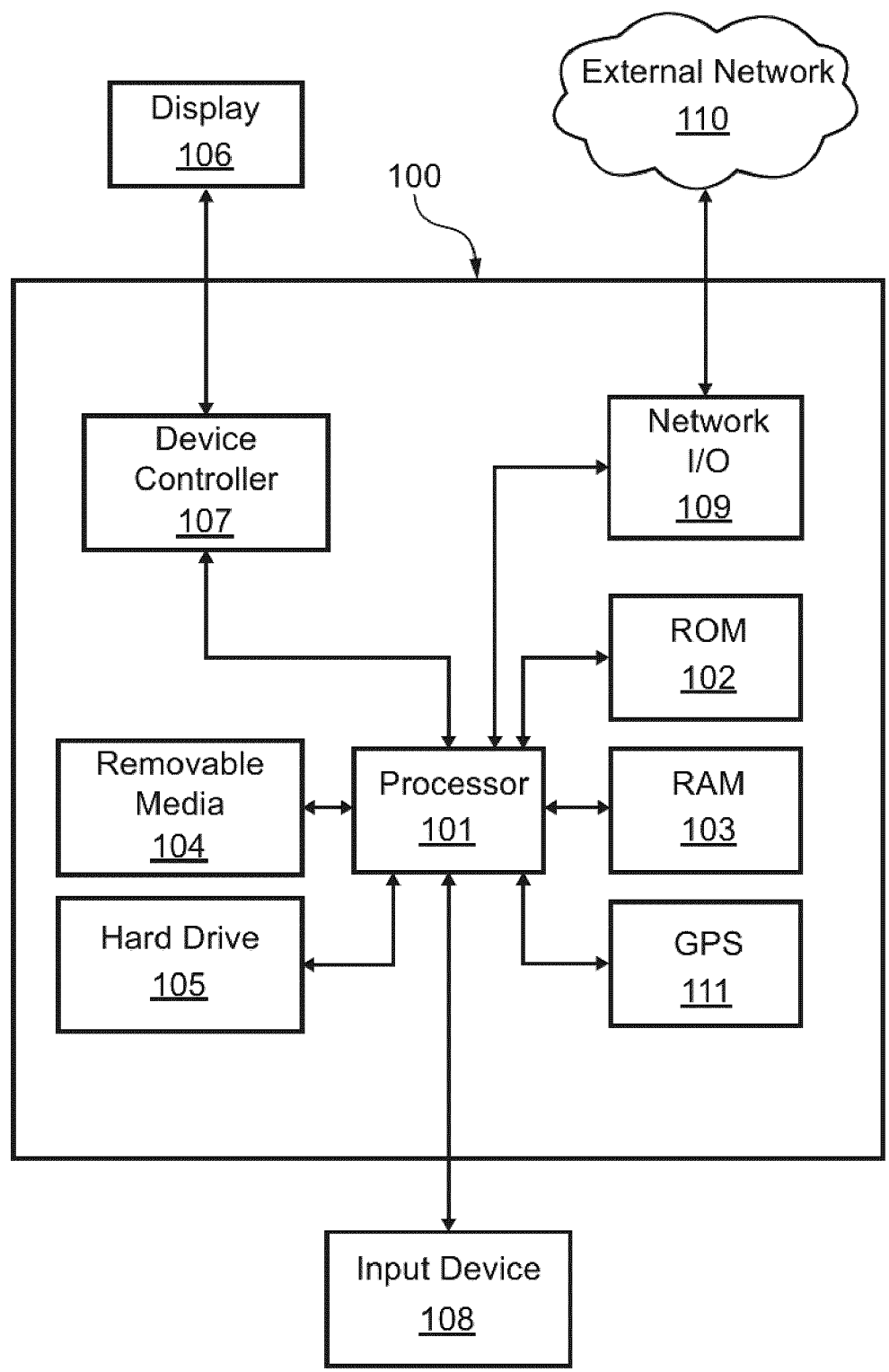
FIG. 1 illustrates an example computing system in accordance with embodiments of the present technology.

It should be noted that, unless otherwise explicitly specified herein, the drawings are not to scale. It is to be expressly understood that the description and drawings are only for the purpose of illustrating certain embodiments of the present technology and are an aid for understanding. They are not intended to be a definition of the limits of the technology.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

As used herein, the singular form "a," "an" and "the" include plural referents unless the context clearly dictates otherwise.

The expression "and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

The productivity of plants can be improved by optimizing the irrigation scheduling in a crop field. Sensors can be placed in the field to perform various measurements such as measurements indicating air quality, weather, soil conditions, and/or other data. One measurement that may be useful in determining when and how to irrigate the crop field is soil water tension (SWT) and/or the SWC. SWT indicates the degree to which water clings to the soil in the crop field. Soil water content (SWC) is a measure of the amount of water (volume or mass) contained in a unit volume or mass of soil. Maintaining the SWT and/or the SWC within an optimal range may increase the productivity of plants in the crop field.

Tensiometers may be used to measure the SWT and/or the SWC in the crop field. The SWT may be measured in kilopascals (kPa). A tensiometer may measure the SWT at a single depth, or may measure the SWT at multiple depths. The SWT for the crop field may be measured and recorded continuously and/or periodically by the tensiometers. The data may be recorded in real-time. It should be understood that although data is described as collected in real-time, there may be delays in collecting the data. The data may be continuously collected after equilibrium conditions are met. The data may also be collected at predetermined intervals. The data may be available for processing, recording, and analysis after the data is acquired by a sensor. The data may be representative of the porous medium surrounding the sensor. This recorded data may then be used to determine thresholds for starting and stopping irrigation. As described in further detail below, tensiometers used for the methods and embodiments described herein may allow measurements of SWT up to about 1500 kPa, and in certain embodiments up to about 2000 kPa. In certain other embodiments, tensiometers with a measurement range of more than about 2000 kPa is also possible, such as a measurement range of up to about 20,000 kPa. Traditional tensiometers which are limited to SWT measurements of no more than about 80 kPa might not suitable for determining irrigation thresholds using the methods described herein. The soil water content (SWC) may be derived indirectly from the tensiometer measurements.

Soil water content (SWC), which is the amount of water present in the soil and which influences plant growth, soil temperature, transport of chemicals and groundwater recharge, may be measured directly, using for example, neutron probes or any other suitable method.

FIG. 1 shows an example computing system 100 that can be used to implement any of the various computing devices discussed herein. In one example implementation, a server is employed that may comprise some or all of the components of system 100, typically in addition to other components (not shown for brevity) as will be appreciated by persons skilled in the art. Functions of a server or other computing device may be executed on varying devices, including but not limited to: a personal computer, a notebook computer, a tablet computer, and/or a mobile communications device, as examples.

Computing system 100 may include one or more processors, collectively denoted as processor 101 in FIG. 1. Processor 101 may execute instructions of a computer program to perform any of the features described herein. Processor 101 may comprise, for example, one or more central processing units (CPUs), and/or one or more graphic processing units (GPUs). The instructions may be stored in any type of computer-readable medium or memory, to configure the operation of processor 101. For example, instructions may be stored in one or more of read-only memory (ROM) 102, random access memory (RAM) 103, removable media 104, such as a Universal Serial Bus (USB) drive, compact disk (CD) or digital versatile disk (DVD), floppy disk drive, flash memory, or any other desired storage medium. Instructions may also be stored in an attached, or internal, hard drive 105.

Computing system 100 may include one or more output devices, such as one or more displays, collectively denoted as display 106 in FIG. 1, and may include one or more output device controllers 107, such as a video processor. There may also be one or more user input devices 108, such as a keyboard, mouse, touch screen, microphone, mobile device such as a smart phone, tablet, and the like. Input devices 108 may also comprise, or be communicatively coupled to, devices that provide sensor data, such an accelerometer, device temperature sensor, SWT data, soil moisture, weather station, dendrometers, stem water potential sensors, or any other sensor measuring plant stress, etc.

Computing system 100 may include one or more network interfaces, such as a network input/output (I/O) circuit 109, for example, a network card, to communicate with an external network 110 and/or other networked devices. Network I/O circuit 109 may be a wired interface, wireless interface, or a combination of the two. Computing system 100 may comprise a location-detecting device, such as a global positioning system (GPS) microprocessor 111, which can be configured to receive and process global positioning signals and determine, with possible assistance from an external server and antenna, a geographic position of computing system 100.

FIG. 1 illustrates a hardware configuration of a computing device in an example implementation of computing system 100, but it should be understood that some or all of the illustrated components may be implemented as software. In some implementations, hardware and software elements may co-exist in a common physical platform. Additionally, modifications may be made to add, remove, combine, or distribute components of computing system 100.

One or more aspects of the disclosure may be embodied in computer-usable data or computer-executable instructions, such as in one or more program modules, executed by one or more computing devices and/or other devices. Generally, program modules include routines, programs, objects, components, data structures, and other elements that perform particular tasks or implement particular abstract data types when executed by a processor in a computing device or other device. The computer-executable instructions may be stored on one or more computer-readable media including but not limited to: a hard disk, an optical disk, solid state memory, RAM, ROM, removable storage media, flash memory, and so on. In various embodiments, the functionality of the program modules may be combined into or distributed among one or more modules residing on one or more devices; the functionality may also be embodied in whole or in part in firmware or hardware equivalents, including but not limited to: integrated circuits, field programmable gate arrays (FPGA), and so on.

Figure 2:
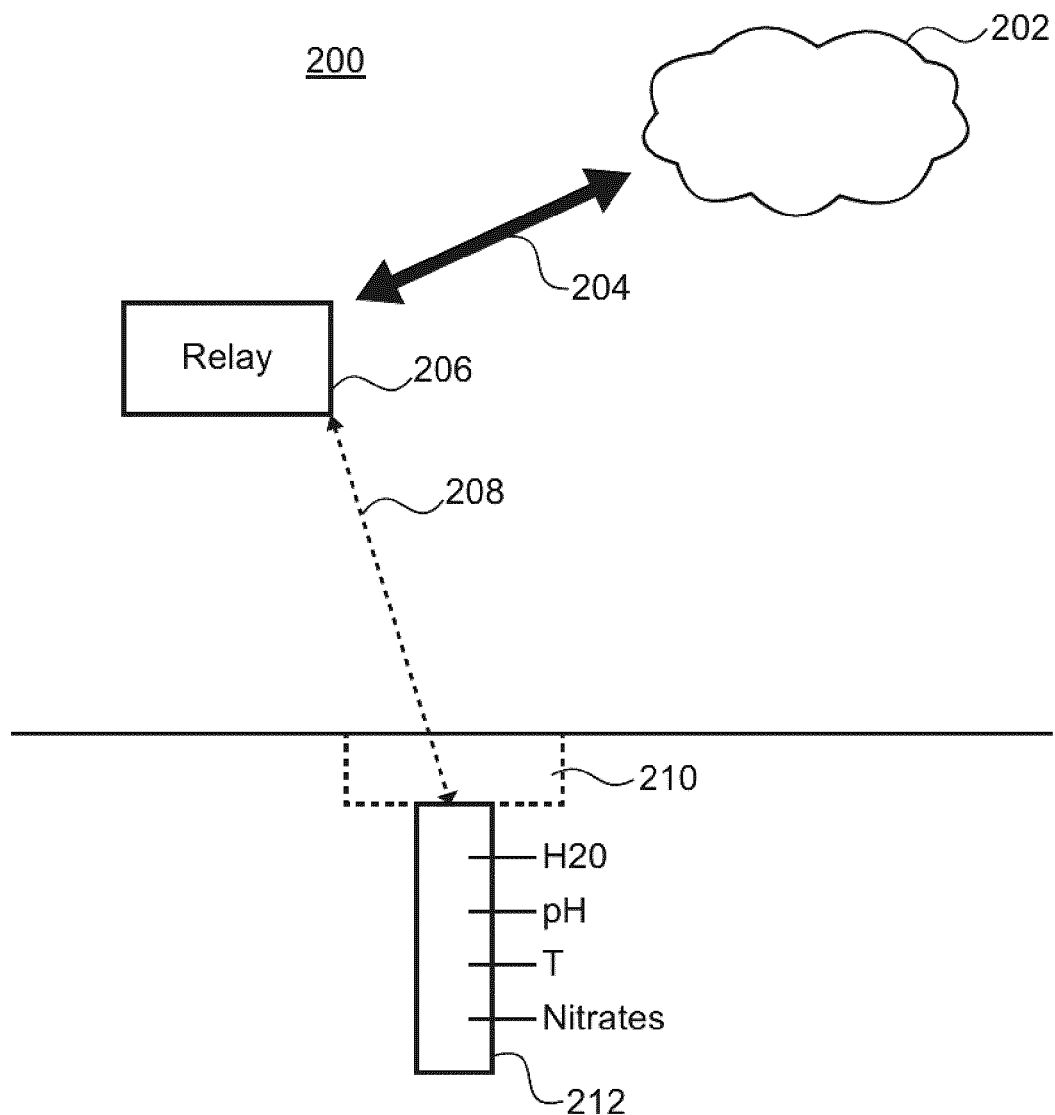
FIG. 2 illustrates an example sensor device in accordance with embodiments of the present technology.

FIG. 2 shows an example sensor device 200 that may be used in one or more embodiments described herein. Sensor device 200 may comprise a relay 206 and a sensor 212. Sensor device 200 may communicate with a communication network 202, which may be part of or coupled to network 110. The communication network 202 may be connected to or communicating with one or more data processing systems (e.g., computing system 100 of FIG. 1), and each data processing system may manage some or all data received from sensor device 200. The sensor device 200 may include a computing system 100, such as an embedded computing system 100. The sensor device 200 may include a portion of the elements of the computing system 100. Data received from sensor device 200 may be stored in a database (not explicitly shown in FIG. 2).

Relay 206 (which may be referred to as a "gateway") may establish a communication connection 208 between sensor 212 and relay 206. Relay 206 may establish a communication connection 204 between relay 206 and communication network 202, or a system accessed using the communication network 202, such as a server. In certain instances of operation, both communication connection 204 and communication connection 208 may be initialized and/or active, while in other instances only one of the communication connections may be active, or a greater number of communication connections may be initialized and/or active. In some implementations, communication connections 204 and/or 208 may be wireless, with communications thereon governed by one or more wireless communication protocols. A wireless communication protocol may be used to exchange data between relay 206, which may be installed above ground, and sensor 212, which may be above ground or buried underground. Wired or wireless communications may be used to transmit data through a ground area 210. The wireless communication protocol may be a wireless protocol designed for low power consumption. Sensor 212 may communicate with other sensors (e.g., at least one other sensor 212). Data communicated between relay 206, sensor(s) 212, and/or communication network 202 may be encrypted.

Sensor 212 (which may also be referred to as a "field sensor" or "probe") may be self-contained and/or may comprise an electrical power source. Sensor 212 may measure one or more variables associated with soil conditions. Examples of variables that can be measured include, but are not limited to: SWT, SWC, soil temperature, pH, soil nitrate content, and soil salinity. Other examples may be identified and described elsewhere in the present disclosure.

Data measured by sensor 212 may be transmitted, through relay 206, to communication network 202. Sensor 212 may be located above ground and/or may be buried at a depth. A depth of sensor 212 may be selected based on a type of variable to be measured. A location and/or depth of sensor 212 may be selected based on whether sensor 212 is to maintain communication link 208 with relay 206. Communications between sensor 212 and communication network 202 may occur without passing through relay 206 or a gateway or the like.

In some implementations, sensor device 200 may measure data continuously and/or in real-time. Moreover, one or more sensor devices 200, or one or more portions of sensor devices 200, may be grouped together to form a sensor station. Depending on the particular implementation, a sensor station may comprise one or more relays, and may connect, directly or indirectly, to one or more data processing systems.

Figure 3:
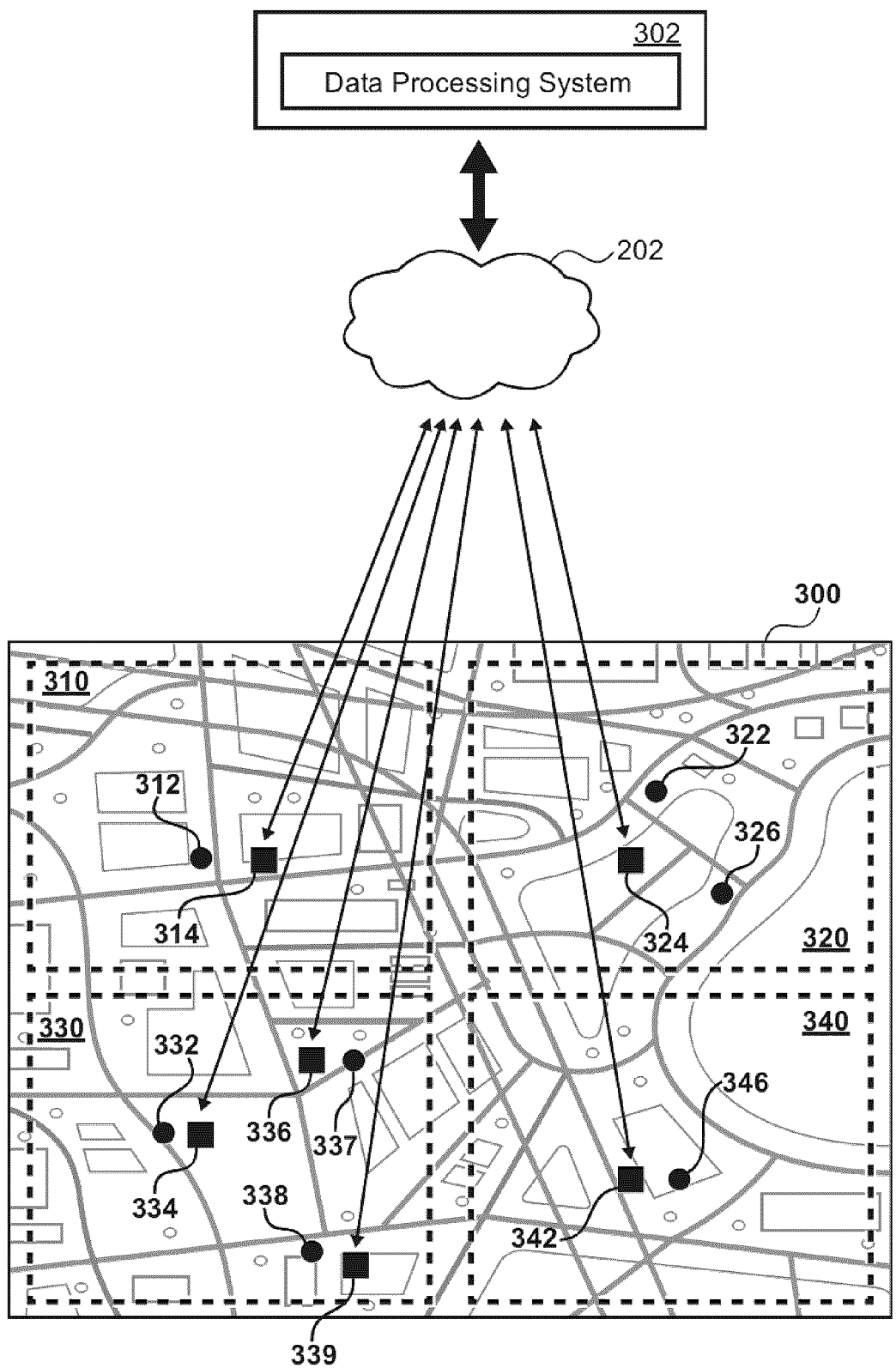
FIG. 3 illustrates an example field irrigation management system in accordance with embodiments of the present technology.

FIG. 3 shows an example implementation where data is collected from sensor devices. FIG. 3 illustrates multiple sensor devices (e.g. sensor device 200 of FIG. 2) that communicate with a data processing system 302 over the communication network 202. The sensor devices are located in an area comprising four plots of land 310, 320, 330, and 340. Plot 310 comprises a sensor 312 and a relay 314, which form one sensor device. Plot 320 comprises two sensors 322 and 326, and one relay 324. Plot 330 comprises three sensors 332, 337, and 338, and three relays 334, 336, and 339. Plot 340 comprises one sensor 346 and one relay 342.

Sensors 312, 322, 326, 332, 337, 338, and 346 are deployed in plots 310, 320, 330, and 340, and may measure variables, such as SWT, in the plots 310, 320, 330, and 340. Each of sensors 312, 322, 326, 332, 337, 338, and 346 may measure one or more variables associated with the soil conditions of their respective area. Relays 314, 324, 334, 336, 339, and 342 may transmit data using the communication network 202. Data processing system 302 may receive data transmitted by the relays 314, 324, 334, 336, 339, and 342. Data processing system 302 may transmit the received data, analyze the received data, store the received data in a database, and/or perform any other functions with all or a portion of the received data.

Data processing system 302 may receive and/or store various types of data, such as topographical data, soil data, hydrographic data, soil use data, wildlife data, plant data, meteorological data, and/or other types of data. For example, data processing system 302 may receive and/or store visible spectral data and/or non-visible spectral data of the areas 310, 320, 330, and 340. Non-visible spectral data of the area may comprise measurements of wavelengths ranging from ultraviolet to microwaves.

The data processing system 302 may transmit commands to one or more irrigation systems. The commands may be transmitted via the communication network 202. The irrigation systems may control irrigation events in the plots of land 310, 320, 330, and/or 340. For example, the data processing system 302 may transmit an instruction to irrigate the plot 340 with a specified amount of water and for a specified amount of time.

Data measured by the sensor devices and/or managed by data processing system 302 may be used, as described in further detail below, for monitoring and controlling crop irrigation. In particular, SWT data and/or SWC data may be measured by the sensors 312, 322, 326, 332, 337, 338, and 346. The SWT data and/or SWC data may be used to determine, for each of the plots of land 310, 320, 330, and 340, an irrigation start threshold and an irrigation stop threshold. The irrigation start and stop thresholds may be used to determine when to activate and deactivate the irrigation systems in the plots of land 310, 320, 330, and 340.

Figure 4:
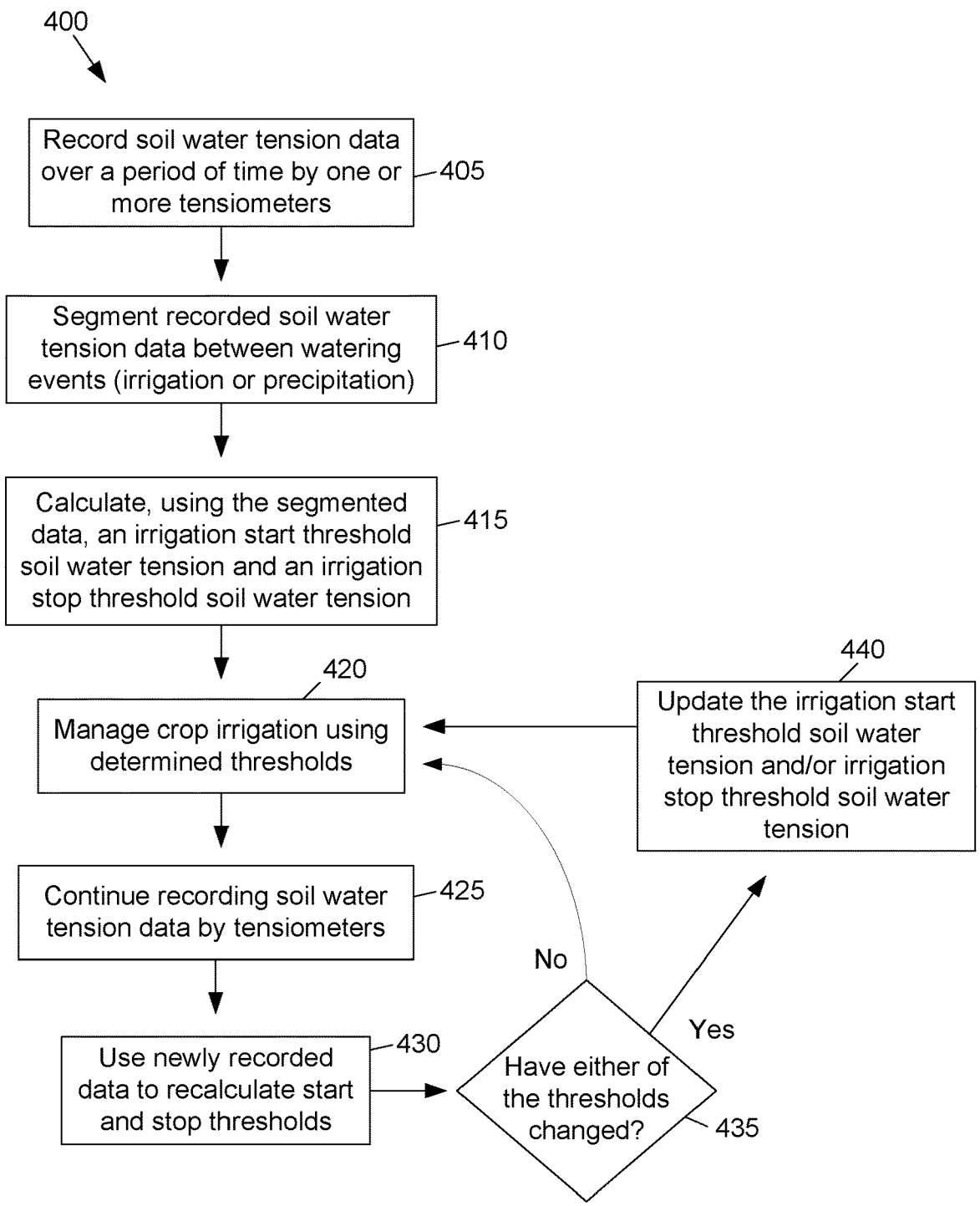
FIG. 4 depicts a flow diagram of a method for managing crop irrigation in accordance with embodiments of the present technology.

FIG. 4 depicts a flow diagram of a method 400 for managing crop irrigation in accordance with embodiments of the present technology. In one or more aspects, the method 400 or one or more steps thereof may be performed by a computing system 100, such as the data processing system 302. The method 400 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 405, SWT data may be recorded and stored. The SWT data may be measured by one or more sensors, such as tensiometers. The sensors may be positioned in one or more crop fields. The sensors may measure the SWT constantly, at predetermined intervals, after receiving a request to measure the SWT, after detecting that an event has occurred, and/or based on any other criteria. The frequency at which measurements are taken may change over time and/or based on events. The SWT data may be collected by the sensors, transmitted to a server, and stored in a database.

The SWT may be measured at multiple locations in a crop field. If multiple SWT measurements are recorded on the plot of land, a single SWT corresponding to the plot of land may be determined. For example, the measurements may be averaged. The SWT may be measured at multiple depths in the crop field. Each stored measurement may be associated with a stored location and/or depth corresponding to the measurement. Each stored measurement may include a timestamp corresponding to the measurement.

In an alternative embodiment, the method 400 may comprise recording SWC data, instead of the SWT data. In another embodiments, the method 400 may comprise recording SWC data and SWT data.

In addition to the SWT data and/or SWC data, other data may be recorded and/or stored, such as measurements of precipitation, temperature, irrigation events, other soil sensor data, air quality data, etc. Various events such as watering events may be detected and stored, and a start timestamp and/or stop timestamp corresponding to the watering event may be recorded. The watering event may be detected using data collected by a rain sensor, data collected from an irrigation system, weather forecasting data, SWC data, SWT data, and/or any other type of data that indicates a watering event.

At step 410 the data recorded at step 405 may be segmented between watering events. The watering events may be when a field was irrigated, when precipitation occurred, or any other event that causes crops to be watered. Between watering events, the recorded data may be broken into segments generated by smoothing of the individual measurements. A first segment may correspond to the SWT and/or the SWC returning to equilibrium (e.g. when the water begins to flow to lower horizons due to gravitational drainage), a second segment corresponding to relatively constant SWT and/or the SWC (e.g. when both water and air are available to the roots zone), and a third segment corresponding to SWT and/or the SWC beginning to build up again indicating watering is needed.

The times at which watering events occurred may be determined based on data recorded by sensors. For example, a pressure sensor may be installed on an irrigation pipe. In this example, when the pressure sensor detects a pre-determined threshold pressure, the occurrence of a watering event may be recorded because the increase in pressure indicates that the irrigation is on.

The watering events may be determined based on the SWT data and/or the SWC. For example a sharp decrease in SWT and/or SWC may be detected, and the time period corresponding to the decrease in SWT and/or SWC may be recorded as a watering event. The derivative of the SWT and/or the SWC may be determined, and when the derivative is over a pre-determined threshold, which indicates a sudden change in SWT and/or the SWC, the time period at which the derivative is over the threshold may be recorded as a watering event.

At step 415 an irrigation start threshold and/or an irrigation stop threshold may be determined based on the segmented data generated at step 410. The irrigation start threshold and/or irrigation stop threshold may be threshold SWTs, threshold SWC and/or any other type of threshold. The irrigation start threshold may be a maximum SWT and/or a maximum SWC. If the measured SWT and/or SWC is greater than the irrigation start threshold, an alert may be issued and/or a watering event may be initiated. The irrigation start threshold may be identified in order to minimize stress on plants and maximize the yield of the plants.

The irrigation stop threshold may be a minimum SWT and/or SWC. If the measured SWT and/or SWC is less than the irrigation stop threshold, a watering event may be stopped. Upon detecting that the SWT and/or the SWC of a field is below the irrigation stop threshold, a command may be sent to an irrigation system to stop irrigation and/or an alert may be issued to a user indicating that the irrigation stop threshold has been satisfied. The irrigation stop threshold may be identified in order to minimize stress on plants, maximize the yield of the plants, and/or reduce leaching.

The irrigation start threshold and/or irrigation stop threshold may include one or more rules. For example the irrigation start threshold may include a first rule that irrigation should begin when the measured SWT and/or the measured SWC is greater than the maximum SWT, and a second rule that irrigation should not begin if the temperature is below a threshold temperature. In this example, even if the measured SWT and/or the measured SWC is above the maximum threshold SWT, irrigation won't begin if the measured temperature is below the threshold temperature. An optimal range for SWT and/or SWC of the crop field may be determined, where the irrigation stop threshold is the lower bound of the optimal range and the irrigation start threshold is the upper bound of the optimal range.

Methods 400, 500, and 600, described below in FIGS. 4-6 and in further detail below, describe methods for determining an irrigation stop threshold and/or an irrigation start threshold using soil water tension data. It will be appreciated that in other embodiments, the methods 400, 500 and 600 may be executed using SWC data instead of SWT. In further embodiments, the methods 400, 500 and 600 may be executed using both SWC data and SWT.

At step 420 crop irrigation may be managed using the thresholds determined at step 415. As described above, the SWT and/or the SWC of a field may be monitored by one or more sensors. When the SWT and/or the SWC of the field satisfies the irrigation start threshold or irrigation stop threshold, irrigation may be started or stopped.

The irrigation may be managed by sending commands to one or more controllable irrigation devices that manage the irrigation of the field. The irrigation may be managed by sending alerts and/or instructions to a user. For example a message or alert may be displayed by a mobile device of the user.

While the irrigation start threshold and/or irrigation stop thresholds are being used to manage irrigation of the field, the irrigation start threshold and/or irrigation stop threshold may be periodically recalculated based on more recent collected data. At step 425 the SWT, and/or the SWC and/or other data may continue to be measured by the sensors, such as tensiometers. As described above in regard to steps 405 and 410, the data may be recorded, stored, and segmented based on watering events. The watering events may be watering events caused by the actions performed at step 420 for managing crop irrigation.

Multiple SWT thresholds and/or SWC thresholds may be determined for a plot of land, where each SWT and/or SWC corresponds to an individual sensor or group of sensors on the plot of land. If the SWT and/or SWC measured by a sensor satisfies the irrigation start threshold corresponding to that sensor, then irrigation may be triggered. Likewise, if the SWT and/or SWC measured by a sensor satisfies the irrigation stop threshold corresponding to that sensor, then irrigation may be stopped.

At step 430 the data recorded at step 425 may be used to recalculate the irrigation start threshold and/or irrigation stop threshold. The irrigation start threshold and/or irrigation stop threshold may be recalculated using the newly collected data. Actions performed at step 430 may be similar to those described above in regard to step 415. The irrigation start threshold and/or irrigation stop threshold may be recalculated at pre-determined intervals, after a threshold amount of new data has been collected, after a pre-defined number of watering events have occurred, after each watering event occurs, and/or based on any other event.

At step 435 the thresholds calculated at step 430 may be compared to the current irrigation start threshold and irrigation stop threshold. If either of the thresholds calculated at step 430 are different from the current threshold, at step 440 the irrigation start threshold and/or irrigation stop threshold may be updated to match the newly calculated thresholds determined at step 430. After updating the thresholds at step 440, the method 400 may proceed to step 420 and continue managing crop irrigation using the updated thresholds.

Instead of replacing the irrigation start threshold and/or irrigation stop threshold, a new irrigation start threshold and/or irrigation stop threshold could be calculated based on the thresholds calculated at step 430. For example the previous irrigation start threshold and the irrigation start threshold calculated at step 430 could be averaged to form the new irrigation start threshold.

If, at step 435, the irrigation start threshold and irrigation stop threshold calculated at step 430 match the previously calculated thresholds, then irrigation thresholds may remain the same and the method 400 may proceed to step 420 and continue managing crop irrigation using the existing thresholds.

Figure 5:
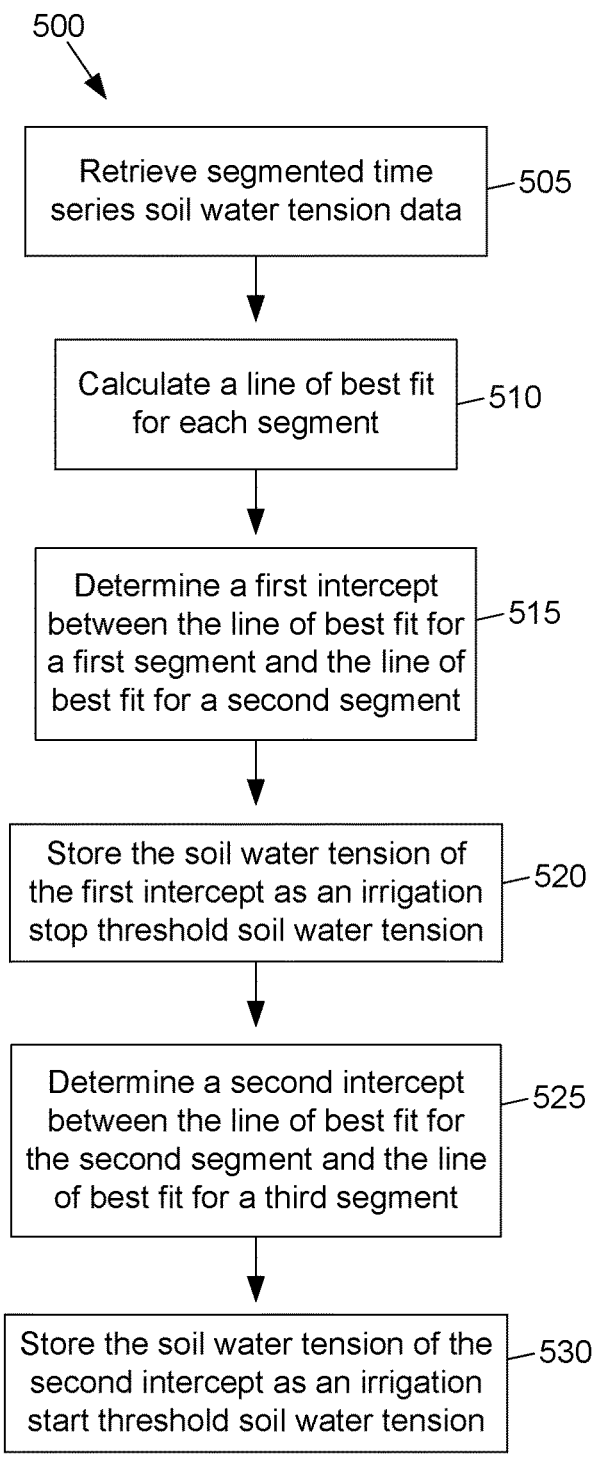
FIG. 5 depicts a flow diagram of a method for determining irrigation thresholds in accordance with embodiments of the present technology.

FIG. 5 depicts a flow diagram of a method 500 for determining irrigation thresholds in accordance with embodiments of the present technology. In one or more aspects, the method 500 or one or more steps thereof may be performed by a computing system 100, such as the data processing system 302. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Figure 7:
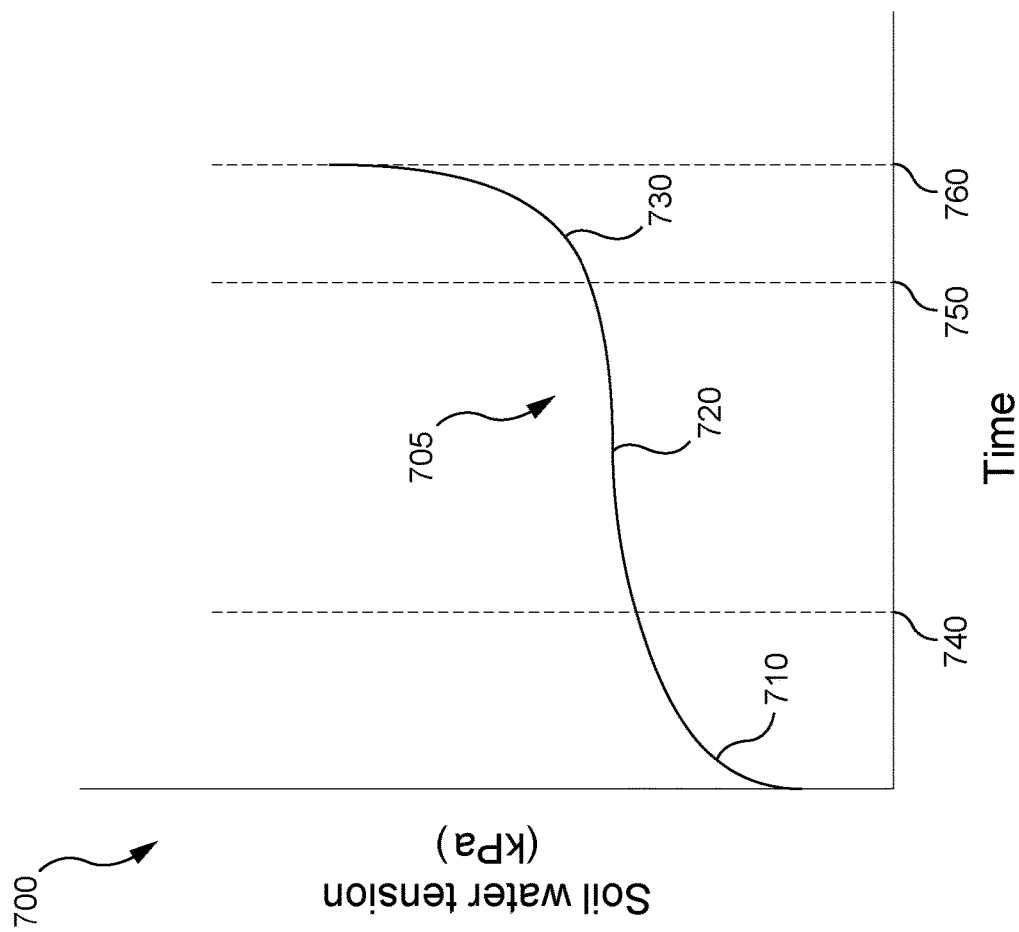
FIG. 7 illustrates a graph of soil water tension (SWT) in accordance with embodiments of the present technology.

At step 505 segmented time series SWT data and/or SWC may be retrieved. The SWT data and/or the SWC data may have been recorded and segmented at steps 405 and 410 of the method 400. Each segment of the SWT data and/or the SWC data may include a series of SWT and/or SWC measurements that were recorded. FIG. 7, described in further detail below, illustrates a curve with segmented SWT data. The retrieved data may be smoothed, such as by removing outliers from data. A smoothing algorithm may be applied to the data to perform the smoothing. To perform the smoothing, an approximating function or algorithm may be created that is configured to capture important patterns in the data while removing noise and/or other fine-scale structures or rapid phenomena. Similar curves are obtained with the SWC data, in certain embodiments.

Figure 8:
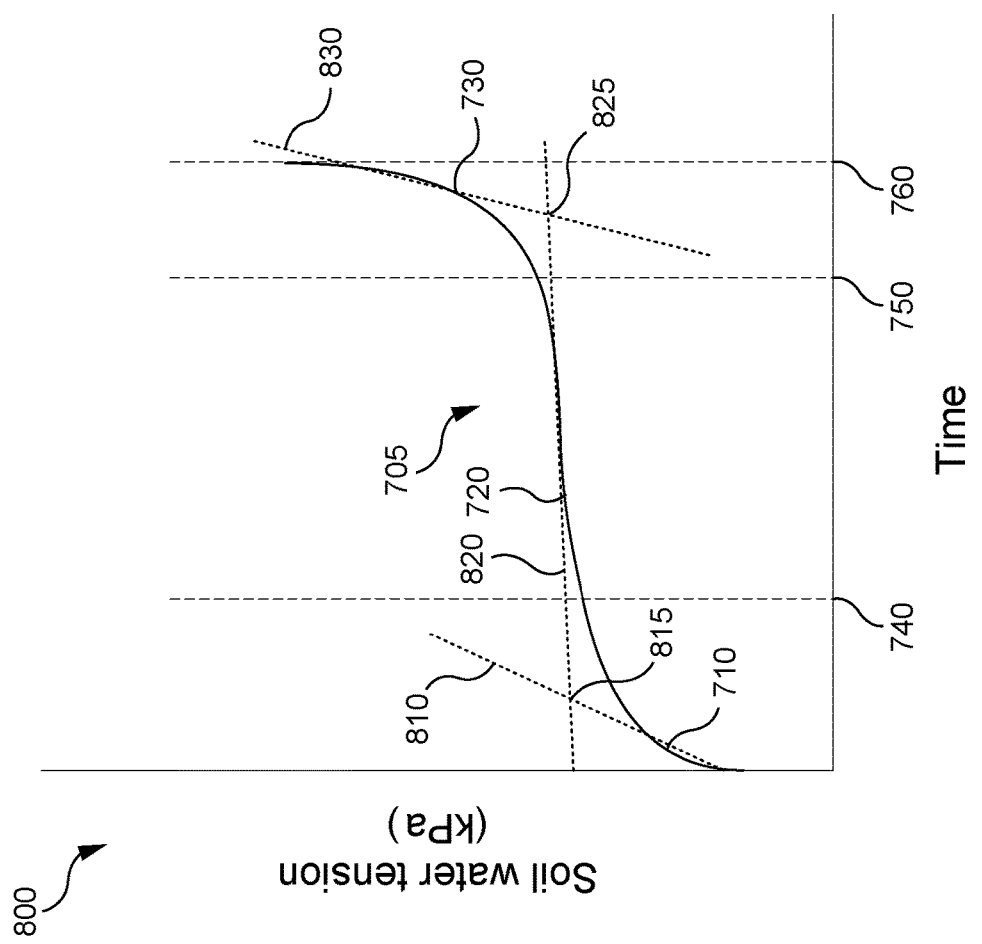
FIG. 8 illustrates a graph of SWT with thresholds in accordance with embodiments of the present technology.

At step 510 a line of best fit may be calculated for each of the segments retrieved at step 505. The line of best fit may be linear or non-linear (exponential, logarithmic, etc.). Any method may be used for calculating the line of best fit, such as least squares. The equation for each line of best fit may be determined and stored. FIG. 8, described in further detail below, illustrates lines of best fit on a segmented SWT curve. Similar lines of best fit are obtained with the SWC data, in certain embodiments.

At step 515 a first intercept may be determined. The first intercept may be determined between a line of best fit for a first segment and a line of best fit for a second segment. The first segment, which correspond to fast drainage of supplied water (e.g. from rain and/or irrigation) to lower horizons occurs before the second segment which corresponds to water and air being both available to the root zone. The first intercept, which is the irrigation stop threshold determined at step 520, is a point at which the line of best fit for the first segment and the line of best fit for the second segment intersect. The intersection point may be recorded as a time and/or SWT, which may be measured in kilopascals (kPa). A pre-determined buffer amount may be added to the irrigation stop threshold, in order to stop irrigation prior to reaching the irrigation stop threshold. In embodiments in which the SWC is monitored, the intersection point may be recorded as a SWC, or a combination of both SWC and SWT.

At step 525 a second intercept may be determined. The second intercept may be the intercept between the line of best fit for the second segment and a line of best fit for a third segment corresponding to water availability no longer being sufficient to meet root demands. The second segment occurs before the third segment. The second intercept, which is the irrigation start threshold stored at step 530, may be determined as a time and/or SWT. In embodiments in which the SWC is monitored, the second intersect may be determined as a time and/or SWC, or a combination of both SWC and SWT.

A pre-determined buffer amount may be subtracted from the irrigation start threshold, in order to activate irrigation prior to reaching the irrigation start threshold.

The method 500 describes one method of determining an irrigation start threshold and an irrigation stop threshold. It may be preferable to use multiple methods to determine an irrigation start threshold and/or an irrigation stop threshold. After determining multiple thresholds, the thresholds could be averaged to form a single irrigation start and/or stop threshold. Method 600, described below, is an example of another method that may be used for determining an irrigation start threshold.

Figure 6:
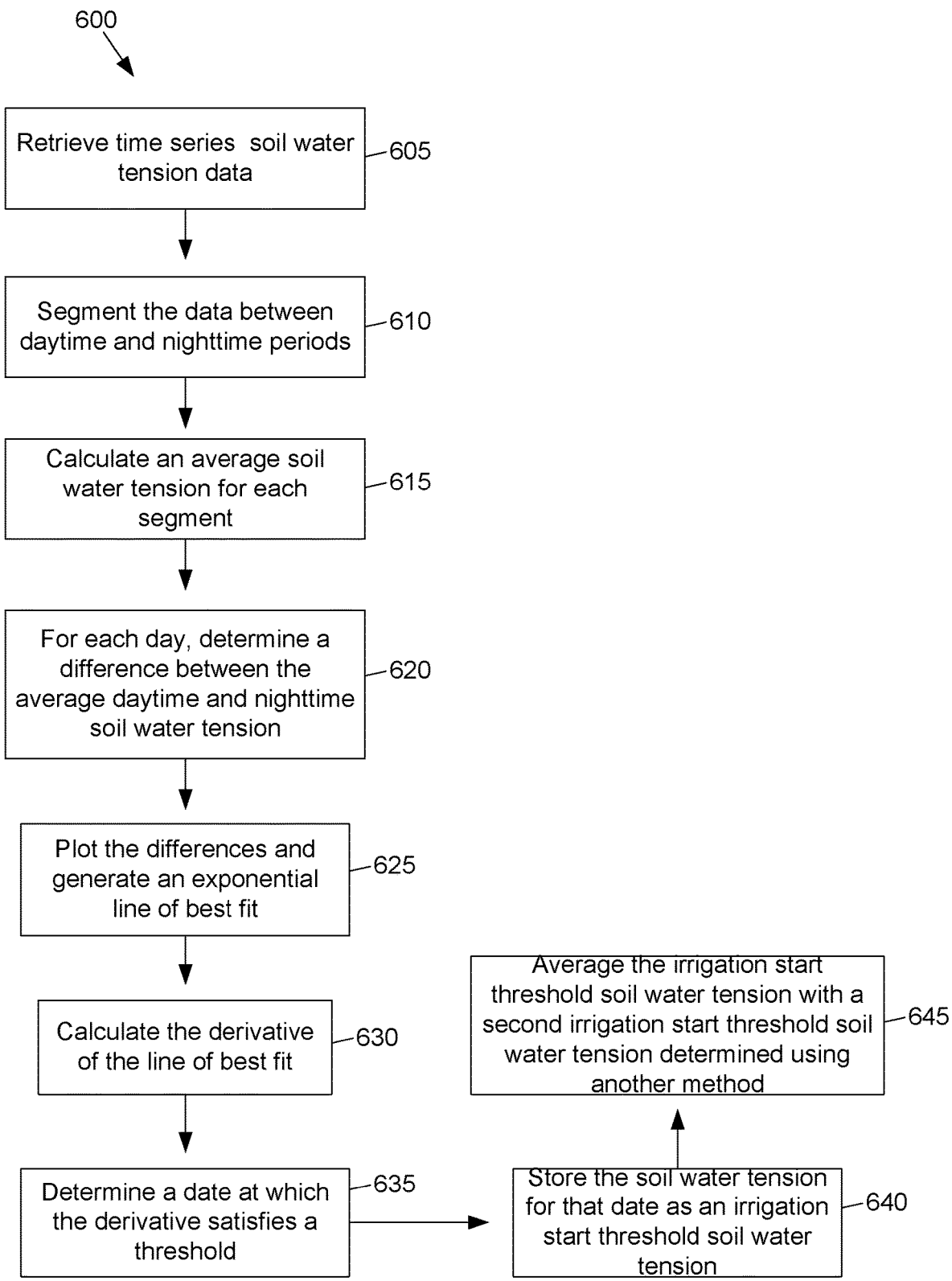
FIG. 6 depicts a flow diagram of a method for determining an irrigation start threshold in accordance with embodiments of the present technology.

FIG. 6 depicts a flow diagram of a method 600 for determining an irrigation start threshold in accordance with embodiments of the present technology. In one or more aspects, the method 600 or one or more steps thereof may be performed by a computing system 100, such as the data processing system 302. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 605 time series SWT data and/or SWC data may be retrieved. The retrieved SWT data and/or SWC data might not be segmented by watering events. At step 610 the retrieved SWT data and/or SWC data may be segmented based on daytime and nighttime periods. For each date that SWT data and/or SWC data was collected, a sunrise time and a sunset time may be determined. The SWT data and/or SWC data starting at the sunrise time and ending at the sunset time may form a segment corresponding to a daytime period. The SWT data and/or SWC data starting at the sunset time and ending at the following day's sunrise time may form a segment corresponding to a nighttime period.

Figure 13:
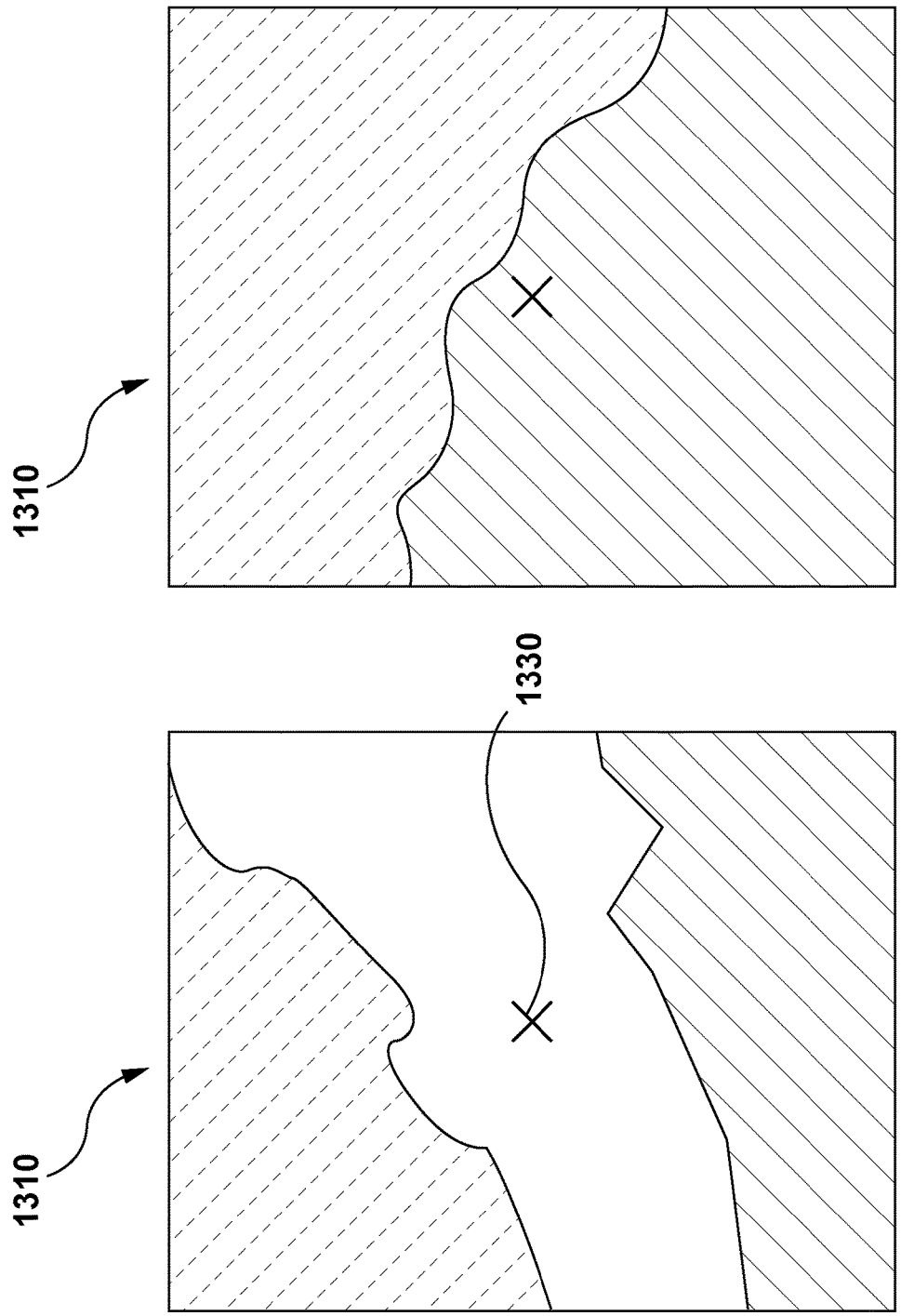
FIG. 13 illustrates fields with different homogenous zones in accordance with embodiments of the present technology.

At step 615 an average SWT and/or SWC data may be calculated for each of the segments. For each segment, the average of all of the SWT measurements and/or SWC measurements taken during the segment may be calculated. A weighted average may be determined, such as when the measurements are not taken at consistent intervals. For example, if a large concentration of measurements were recorded during a short time period, those measurements may be given a lower weight. FIG. 13 illustrates fields with different homogenous zones. In the area 1310 there are two fields with different homogenous zones identified by NDVI images (blue is too wet, red is too dry). All these zones may be considered when deriving a threshold at the station 1330. Thus, the threshold is adjusted based on the weight of the area of each zone to minimize stressed zones. If there are 3 sensors (such as 1 at 12", 1 at 24" and 1 at 36"), the weight of each depth could equal (33.3%), or one or two depths could have a larger weight. For example the assigned weights could be 50% at 12", 40% at 24", 10% at 36". The weights could be given to represent the root density in relationship with the depth. For the irrigation stop threshold, the weight could be given to minimize leaching (we can accept leaching at 12 and 24", but avoid leaching at 36" by according a larger weight to the probe at 36").

At step 620 a difference between the daytime average SWT and/or SWC and the nighttime average SWT and/or SWC may be calculated for each pair of daytime/nighttime segments. A difference may be determined for each date. The differences may then be stored along with a date corresponding to each difference.

At step 625 an exponential line of best fit may be determined for the differences. Each of the differences may be plotted on a graph, where the x-axis is the date and the y-axis is the difference between the daytime and nighttime SWT averages and/or SWC averages for that date. A line of best fit may be determined based on those plotted points. The line of best fit may be an exponential line of best fit.

At step 630 the derivative of the line of best fit may be calculated. The derivative may indicate the slope of the line of best fit at a given point in time. At step 635 a date may be determined where the derivative satisfies a threshold. The threshold may be a pre-determined threshold. The threshold may indicate a threshold slope of the line of best fit.

At step 640 the SWT and/or SWC difference for the date determined at step 630 may be determined. The difference (measured in kPa) may be stored as an irrigation start threshold SWT and/or irrigation start threshold SWC. The difference may be determined by inputting the date determined at step 630 to the line of best fit determined at step 625.

At step 645 the irrigation start threshold determined at step 640 may be averaged with a second irrigation start threshold. The second irrigation start threshold may have been determined at step 530 of the method 500, as described above. By calculating two irrigation start thresholds using different methods and then averaging those thresholds, the final irrigation start threshold may be more accurate, less affected by outliers in the data, and/or may lead to more productive crops.

FIG. 7 illustrates a graph 700 of SWT in accordance with embodiments of the present technology. The graph 700 has time on the x-axis and SWT, measured in kPa, on the y-axis. A curve 705 is formed by plotting the measured SWT of a crop field over time. The plotted SWT at each time may be an average of multiple measurements, such as when a field has multiple tensiometers measuring data on that field. Similar curves are observed with SWC.

The curve 705 may have been recorded between watering events and is split into segments 710, 720, and 730. Segment 710 begins when a watering event ends and ends at the time 740. As described above, the segment 710 corresponds to the SWT returning to equilibrium (e.g. when the water begins to flow to lower horizons due to gravitational drainage). The second segment 720 begins at the time 740 and ends at the time 750. The second segment corresponds to relatively constant SWT (e.g. when both water and air are available to the roots zone). The third segment 730 begins at the time 750 and ends at the beginning of another watering event at time 760. The third segment corresponds to SWT beginning to build up again indicating watering is needed. The segments 710, 720, and 730 are examples of segments formed at step 410 of the method 400.

FIG. 8 illustrates a graph of SWT with thresholds in accordance with embodiments of the present technology. A line of best fit 810, 820, and 830 is illustrated for each of the segments 710, 720, and 730. The line of best fit 810 corresponds to the segment 710, the line of best fit 820 corresponds to the segment 720, and the line of best fit 830 corresponds to the segment 730. Although the lines of best fit 810, 820, and 830 are illustrated as linear, any other type of line of best fit may be used. The lines of best fit 810, 820 and 830 may be determined using any method such as a least squares method. The determination of the lines of best fit 810, 820 and 830 may be manual, automatic or semi-automated. Similar lines of best fit are observed with SWC.

As described above in regard to the method 500, intercepts between the lines of best fit can be determined and used as an irrigation start threshold or irrigation stop threshold. The intercept 815 is the intersection of the lines of best fit 810 and 820. The SWT and/or SWC at the intercept 815 may be stored as an irrigation stop threshold, for example if it is desired to avoid excess water. The intercept 825 is the intersection of the lines of best fit 820 and 830. The SWT and/or SWC at the intercept 825 may be stored as an irrigation start threshold. After determining the irrigation start threshold and irrigation stop threshold based on the intercepts 815 and 825, the thresholds may be used to control irrigation for the field.

In certain embodiments, the intercept 815 may be ignored and no irrigation stop threshold stored, for example if it is desired to allow leaching to avoid salts from building up in the soil (i.e. salinity control).

Tensiometer with Wide Range

Figure 9:
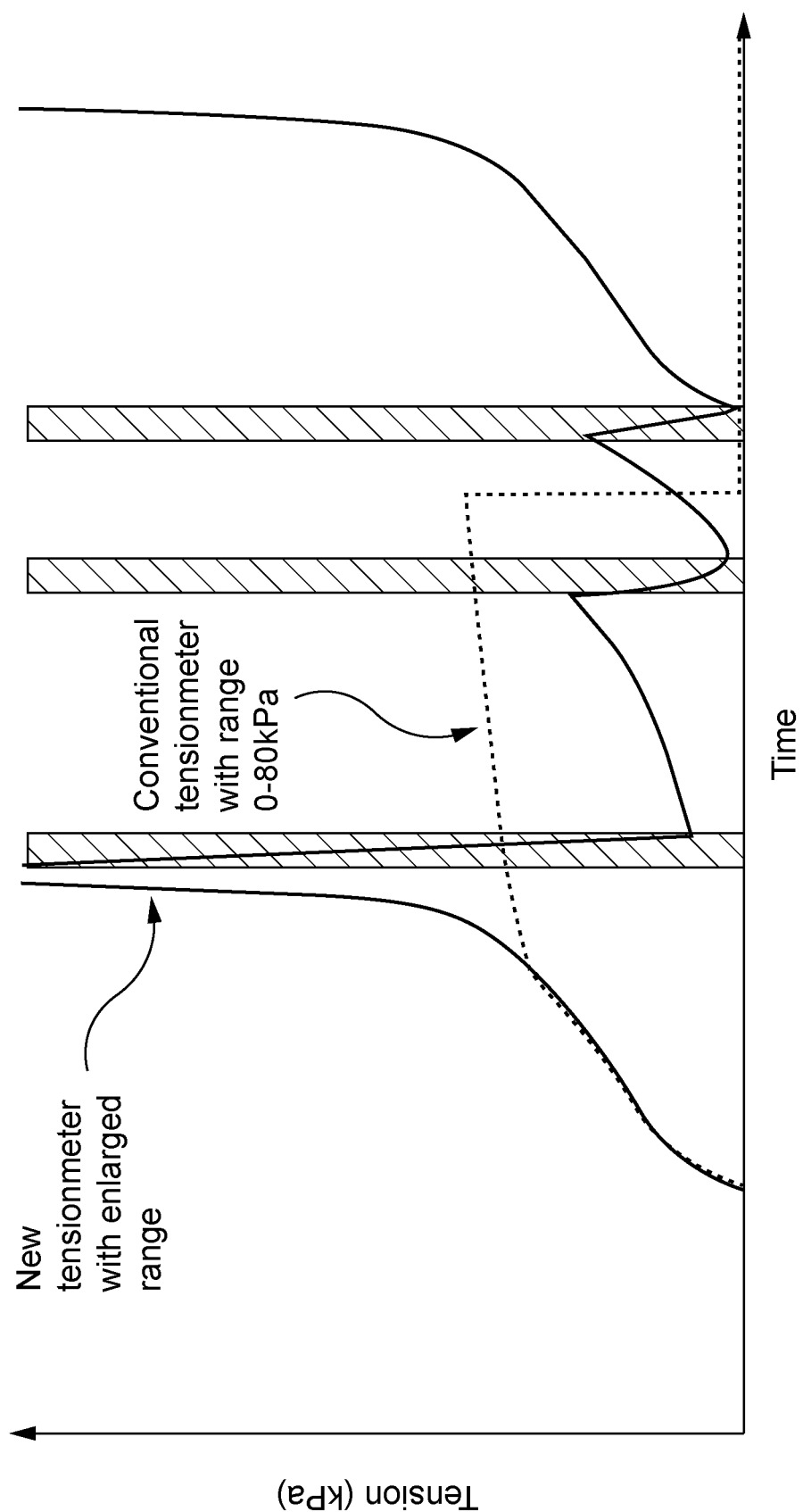
FIG. 9 illustrates differences in SWT measurements made with a traditional tensiometer and SWT measurements made with a tensiometer having a wider range in accordance with embodiments of the present technology.

FIG. 9 illustrates differences in SWT measurements made with a traditional tensiometer and SWT measurements made with a tensiometer having a wider range. Each tensiometer has a range for SWT measurements, with a maximum SWT that can be measured and a minimum SWT that can be measured. Above or below this range, the tensiometer might not be able to perform accurate SWT measurements. Traditionally tensiometers have a maximum SWT measurement of approximately 80 kPa. A tensiometer with a wider range may be used. The tensiometer with wider range may be capable of measuring, for example, SWT up to 1500 kPa, 2000 kPa or more than 2000 kPa and up to about 20,000 kPa.

The dotted line in FIG. 9 illustrates SWT measured by a traditional tensiometer. As can be seen in FIG. 9, after the SWT passes a maximum or minimum threshold, the readings from the traditional tensiometer are no longer accurate. Each of the solid vertical bands illustrates a watering event. The traditional tensiometer does not capture the swings in SWT that occur after each watering event.

The solid line illustrates SWT measured by a tensiometer having a wider range. As can be seen, these readings are more accurate and capture the changes in SWT after each watering event. By using a tensiometer with a wider range, more accurate SWT data may be collected. The data collected by the tensiometer with a wider range may be used for the methods 400, 500, and/or 600.

Optimal Range

The optimal range for SWT, SWC and/or other variables for maximizing the production of plants in a crop field, or a portion of a crop field, may be determined. The irrigation stop threshold may be an approximation of the lower bound of the optimal range and the irrigation start threshold may be an approximation of the upper bound of the optimal range. The optimal range may change over time and may vary with soil characteristics, crop, age of crop, stage of growth, irrigation system, and environmental conditions. In order to adapt to the changing optimal range, the irrigation start threshold and/or irrigation stop threshold may be recalculated, or otherwise updated, based on more recently collected data.

The optimal range may be determined using SWT data, SWC and/or other types of data. Data from several depths, from several types of probes, and/or or from different data sources could be combined. This measured data may be used to derive other parameters.

Figure 10:
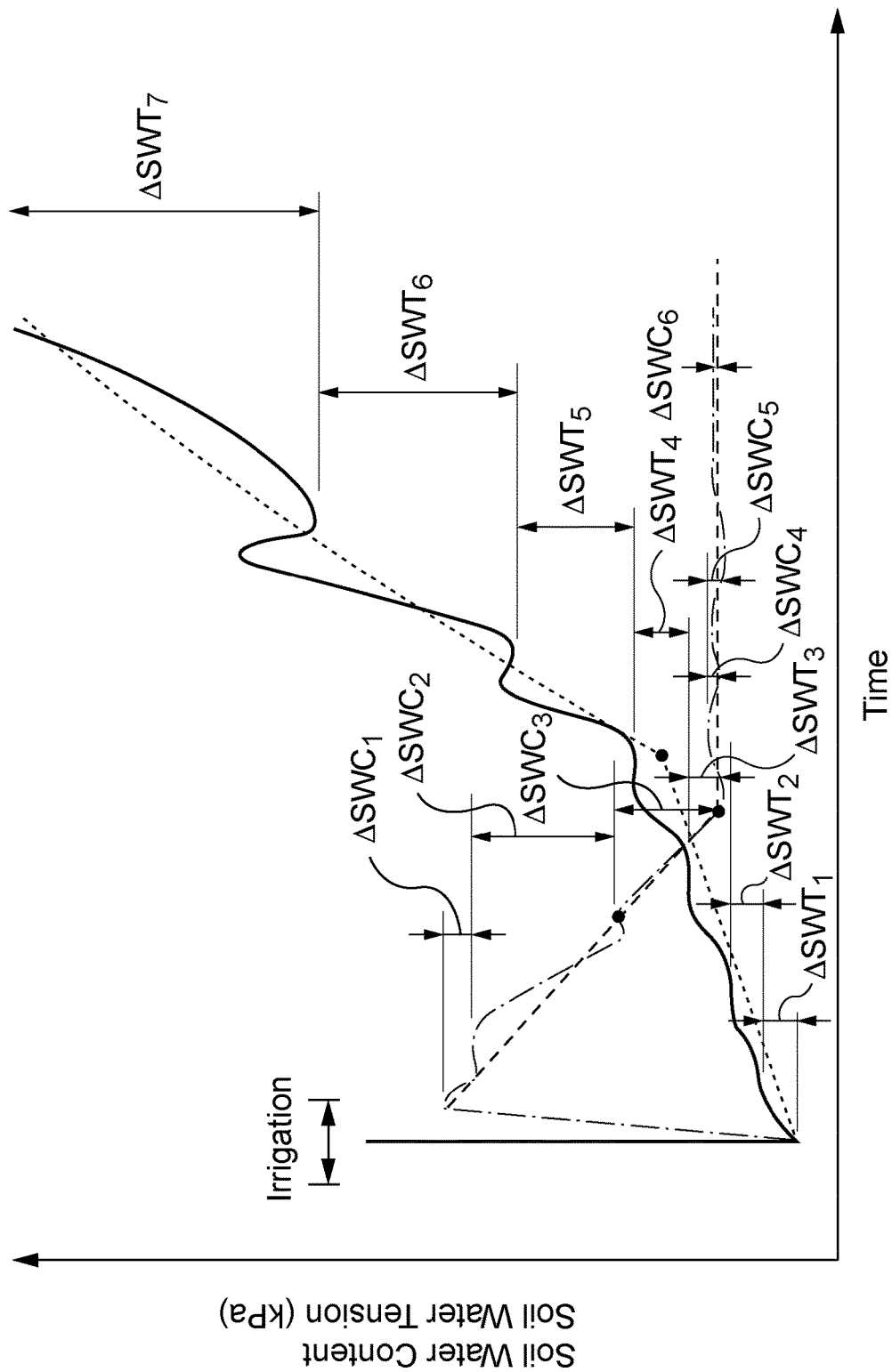
FIG. 10 illustrates a graph of time series data for SWT measured by a tensiometer and SWC measured by a soil moisture sensor in the same location in accordance with embodiments of the present technology.

FIG. 10 illustrates a graph of time series data for SWT measured by a tensiometer and SWC measured by a soil moisture sensor in the same location. The unit of the optimal range may be the unit of one of the variables measured by one of these probes. For example, tensiometers and water depth probes installed at different depths and spaced laterally may be used to determine hydraulic conductivity and/or vertical and lateral water flux. By integrating flux in a domain comprising the entire root zone, a volume of water can be calculated over a period of time. If this volume is less than the theoretical evapotranspiration, a third irrigation start threshold may be obtained and may be averaged with irrigation start thresholds calculated using other methods, such as the irrigation start thresholds determined at steps 530 and step 640.

Figure 11:
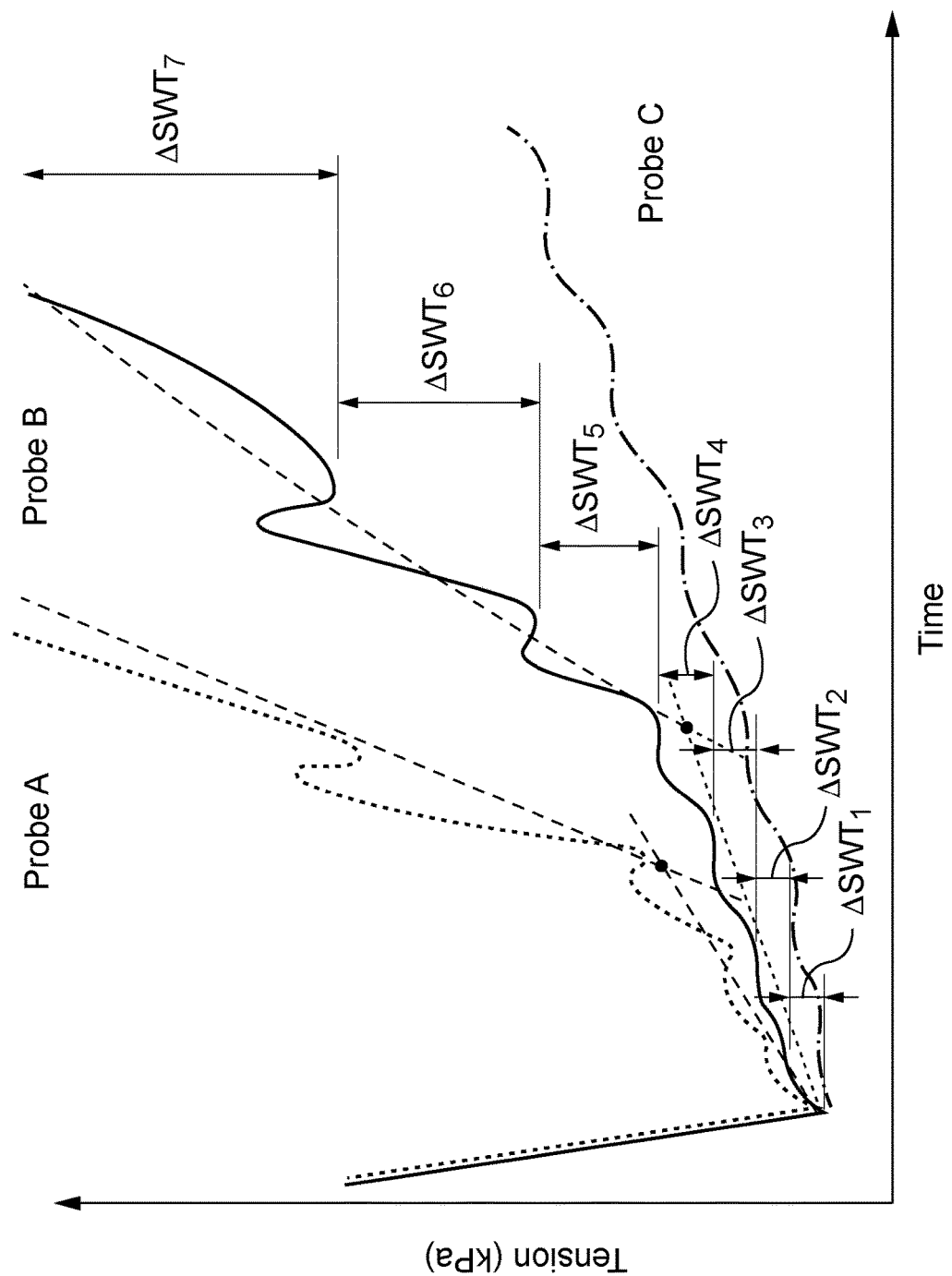
FIG. 11 illustrates a graph of SWT measured by multiple tensiometers in accordance with embodiments of the present technology.

FIG. 11 illustrates a graph of SWT measured by multiple tensiometers (Probes A, B and C). A network of spatially distributed sensors located in a crop field or farm, in addition to soil maps, a normalized difference vegetative index (NDVI), and/or any other information related to crop production, may be used to determine irrigation start and stop thresholds for the crop field or farm. By increasing the number of sensors in the crop field or farm, a more accurate optimal range may be determined.

Measurements may be taken at different depths in a soil profile. An optimal range may then be determined for each depth and/or an optimal range may be determined for the entire root zone and/or soil profile. A weight may be assigned to each depth based on the importance of the measurements taken at the respective depth to plant production.

After determining an optimal range, collected data may be used to confirm and/or modify the determined optimal range. The accuracy of the optimal range may be determined at the end of an irrigation event, after a growing season, at a pre-determined interval, and/or at any other interval. Various types of measured data and/or derived data may be used to determine the accuracy of the optimal range, such as vegetation health indices based on multispectral measurements (e.g. NDVI), variables measuring vegetative growth or fruit development, and/or any other parameter referring to plant health, plant growth, or performance development. The parameter or parameters used to determine the accuracy of the optimal range may be chosen based on the parameter selected to be optimized. For example, fruit development may be favored at the expense of vegetative growth.

Figure 12:
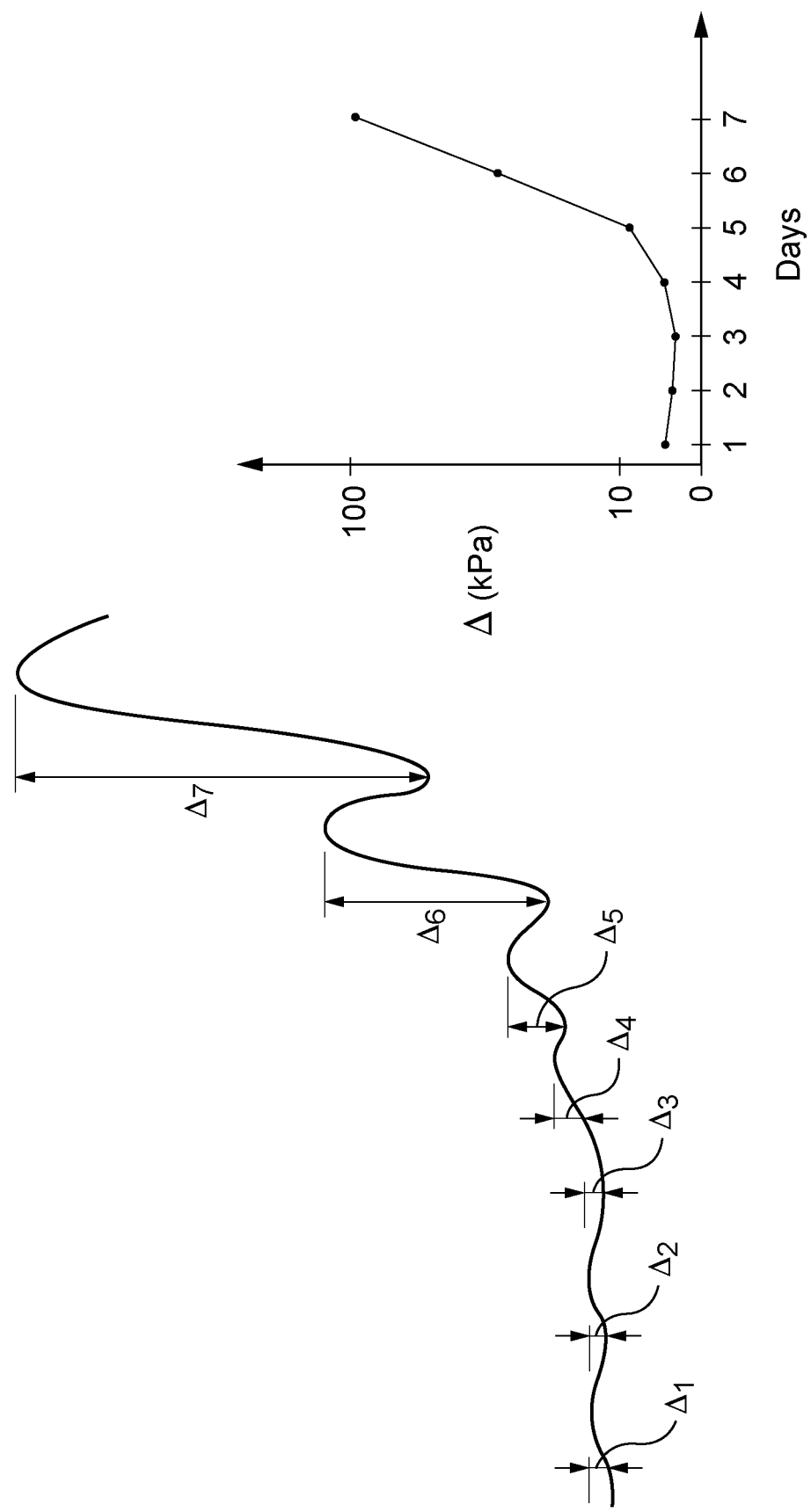
FIG. 12 illustrates a graph of changes in SWT between day and night in accordance with embodiments of the present technology.

FIG. 12A shows the soil tension profile over time and during different watering events. When the change in soil tension ($\Delta T$) is plotted against time (FIG. 12B) an approximate logarithmic relationship can be observed.

Database of Optimal Ranges

Determined irrigation start thresholds, irrigation stop thresholds, and/or optimal ranges may be stored in a database. Each stored threshold and/or range may be associated with a corresponding crop type, age of crop, stage of growth, irrigation system, environmental conditions, and/or other related data.

After sensors are placed in a crop field, the database may be queried for stored data with similar conditions to the crop field. An irrigation start threshold and irrigation stop threshold may be determined by identifying data stored in the database with similar conditions (weather, soil, irrigation system, stage of growth, etc.) to the crop field. The conditions of the crop field may be classified using a classifier, such as a random forests (RF) or neural network (NN) based classifier. When a new sensor is installed, the first derivation of the thresholds may be made using the classification models.

A machine learning algorithm (MLA), such as a deep learning algorithm, may be used to predict an irrigation start threshold and/or irrigation stop threshold. The MLA may be trained using the data stored in the database. The predicted thresholds may be disabled if the measured data does not correspond to the predicted thresholds. The MLA may be used to predict the thresholds in the future, such as over the following days.

Determining Irrigation Start Threshold Based on Weather Conditions

Figure 14:
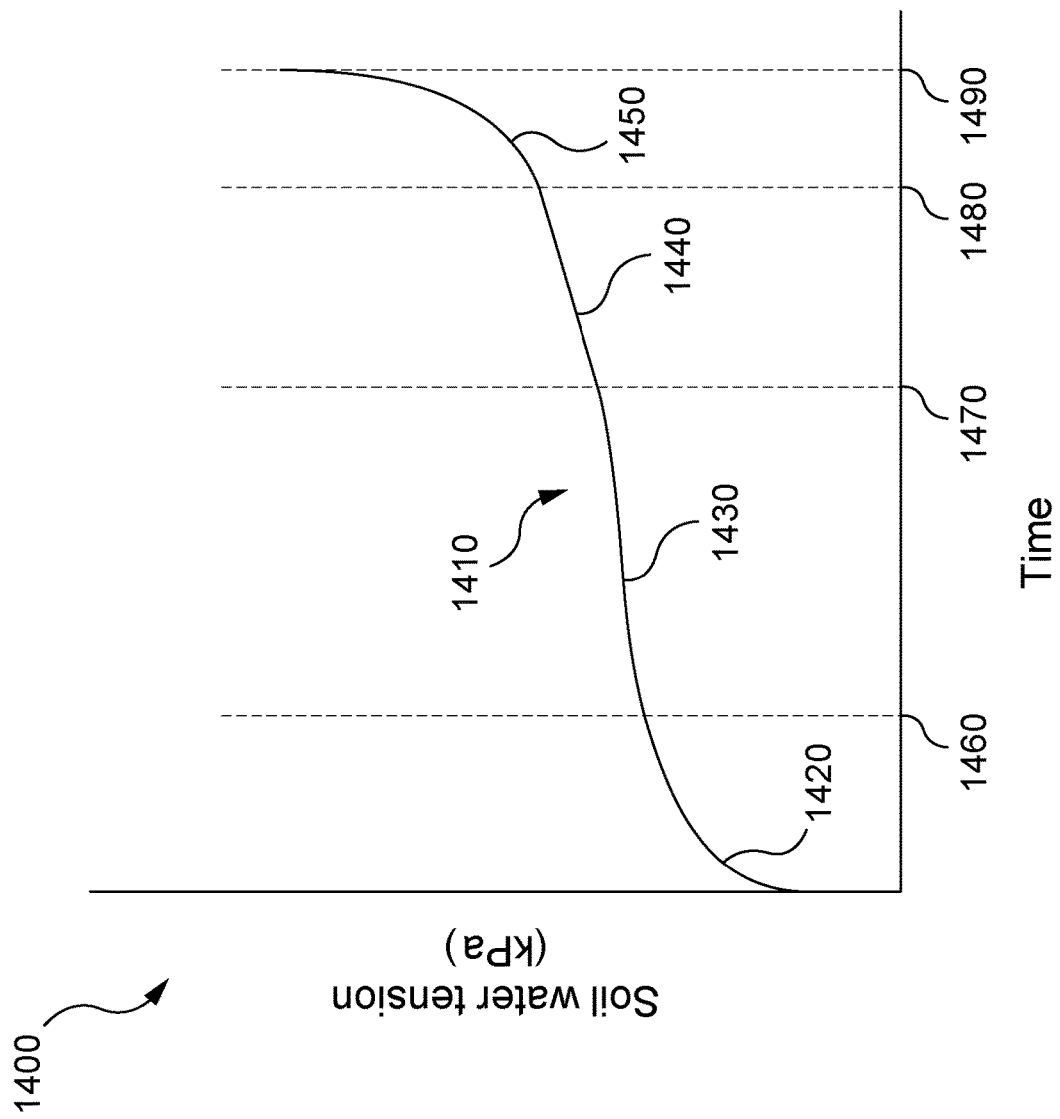
FIG. 14 illustrates a graph of SWT with four segments in accordance with embodiments of the present technology.

FIG. 14 illustrates a graph 1400 of SWT with a curve 1410 divided into four segments 1420, 1430, 1440, and 1450 in accordance with embodiments of the present technology. The curve 1410 may represent SWT measurements taken in between two watering events. The first segment 1420 begins at the end of a watering event and ends at time 1460. The first segment 1420 may be similar to the segment 710. The second segment 1430 begins at the time 1460 and ends at the time 1470. The second segment 1430 may be similar to the segment 720.

The third segment 1440 begins at the time 1470 and ends at the time 1480. The third segment. The third segment 1440 represents a zone (data range) where the irrigation start threshold could be located depending on weather conditions. If evapotranspiration is high in the prime-time of the season, then the threshold will be at the beginning of the segment 1440. If evapotranspiration is low, then the threshold will be at the end of the segment 1440.

The fourth segment 1450 begins at the time 1480 and ends at the time 1490, which is the beginning of another watering event. The fourth segment 1450 may be similar to the segment 730. Similar curves are observed for monitored SWC.

While the present technology has been described in connection with specific embodiments thereof, it will be understood that it is capable of further modifications and this application is intended to cover any variations, uses, or adaptations following, in general, the principles of the present technology and including such departures from the present disclosure as come within known or customary practice within the art to which the present technology pertains and as may be applied to the essential features hereinbefore set forth, and as follows in the scope of the appended claims.

While the present technology has been described in connection with specific embodiments thereof, it will be understood that it is capable of further modifications and this application is intended to cover any variations, uses, or adaptations following, in general, the principles of the present technology and including such departures from the present disclosure as come within known or customary practice within the art to which the present technology pertains and as may be applied to the essential features hereinbefore set forth, and as follows in the scope of the appended claims.

What is claimed is:

1. A system for regulating plant irrigation at a crop field, the system being communicatively couplable to:
   one or more monitoring sensors for monitoring hydrodynamic conditions at the given crop field, and
   one or more controllable devices that are operable to irrigate the given crop field; the system comprising:
   at least one processor, and
   memory storing a plurality of executable instructions which, when executed by the at least one processor, cause the system to:
   retrieve soil water tension (SWT) data and/or soil water content (SWC) data, corresponding to the crop field, recorded by the one or more monitoring sensors;
   segment the SWT data and/or SWC data in three segments;
   determine, for each of the three segments, a respective line of best fit;
   determine a first intercept between the line of best fit for the first segment and the line of best fit for the second segment;
   determine a second intercept between the line of best fit for the second segment and the line of best fit for the third segment;
   store the first intercept as an irrigation stop threshold representative of a desired irrigation end point;
   store the second intercept as an irrigation start threshold representative of a desired irrigation commencement point; and
   monitor SWT data and/or SWC data received from the one or more monitoring sensors, and:
   in response to a determination that the SWT and/or SWC has reached the irrigation start threshold, cause the one or more controllable devices to commence or increase irrigation of the crop field; and
   in response to a determination that the SWT and/or SWC has reached the irrigation stop threshold, cause the one or more controllable devices to stop or reduce irrigation of the crop field.

2. The system of claim 1, wherein the executable instructions, when executed by the at least one processor, cause the system to smooth the SWT data and/or SWC data after retrieving the SWT data and/or SWC data.

3. The system of claim 1, wherein the executable instructions, when executed by the at least one processor, cause the system to determine a derivative of the line of best fit for the first segment, the line of best fit for the second segment, and the line of best fit for the third segment.

4. The system of any of claim 1, wherein the executable instructions, when executed by the at least one processor, cause the system to:
   determine, by comparing average SWT and/or SWC during daytime periods to average SWT and/or SWC during nighttime periods, a second irrigation start threshold; and
   determine an average of the irrigation start threshold and the second irrigation start threshold.

5. The system of claim 1, wherein the one or more monitoring sensors comprise one or more tensiometers.

6. The system of claim 5, wherein the one or more tensiometers are configured to measure SWT up to 2000 kPa.

7. The system of claim 1, wherein the one or more monitoring sensors comprise a plurality of tensiometers arranged to measure SWT at different locations in the crop field.

8. The system of any of claim 1, wherein the first segment occurs before the second segment, and wherein the second segment occurs before the third segment.

9. The system of claim 1, wherein the monitoring the SWT data and/or SWC data is in real-time.

10. The system of claim 1, wherein the segmenting the SWT data and/or SWC data in three segments comprises segmenting the SWT data and/or SWC data based on watering events.

11. A method comprising:
    retrieving soil water tension (SWT) data and/or soil water content (SWC) data corresponding to a crop field, wherein the SWT data and/or SWC data was recorded by one or more monitoring sensors;
    segmenting the SWT data and/or SWC data into three segments;
    determining, for each of the three segments, a respective line of best fit;
    determining a first intercept between the line of best fit for the first segment and the line of best fit for the second segment;
    determining a second intercept between the line of best fit for the second segment and the line of best fit for the third segment;
    storing the first intercept as an irrigation stop threshold representative of a desired irrigation end point;
    storing the second intercept as an irrigation start threshold representative of a desired irrigation commencement point; and
    monitoring SWT data and/or SWC data received from the one or more monitoring sensors, and:

in response to a determination that the SWT and/or SWC has reached the irrigation start threshold, causing one or more controllable devices to commence or increase irrigation of the crop field, and in response to a determination that the SWT and/or SWC has reached the irrigation stop threshold, causing the one or more controllable devices to stop or reduce irrigation of the crop field.

12. The method of claim 11, further comprising smoothing the SWT data and/or SWC data.

13. The method of claim 11, further comprising determining a derivative of the line of best fit for the first segment, the line of best fit for the second segment, and the line of best fit for the third segment.

14. The method of claim 11, further comprising:
determining, by comparing average SWT and/or SWC during daytime periods to average SWT and/or SWC during nighttime periods, a second irrigation start threshold; and
determining an average of the irrigation start threshold and the second irrigation start threshold.

15. The method of claim 11, wherein the one or more monitoring sensors comprise one or more tensiometers.

16. The method of claim 15, wherein the one or more tensiometers are configured to measure SWT up to 2000 kPa.

17. The method of claim 11, wherein the one or more monitoring sensors comprise a plurality of tensiometers arranged to measure SWT and/or SWC at different locations in the crop field.

18. The method of claim 11, wherein the first segment occurs before the second segment, and wherein the second segment occurs before the third segment.

19. The method of claim 11, wherein the monitoring SWT data and/or SWC data is in real-time.

20. A system for regulating plant irrigation at a crop field, the system comprising:
one or more monitoring sensors for obtaining soil water tension (SWT) data and/or soil water content (SWC) data at the crop field over time;
at least one processor communicatively couplable to the one or more monitoring sensors;
memory, communicatively couplable to the at least one processor, storing a plurality of executable instructions which, when executed by the at least one processor, cause the at least one processor to:
segment the SWT data and/or SWC data into two segments;
determine, for each of the two segments, a respective line of best fit;
determine an intercept between the line of best fit for the first segment and the line of best fit for the second segment;
store the intercept as an irrigation stop threshold representative of a desired irrigation end point; and
in response to a determination that the SWT and/or SWC has reached the irrigation stop threshold, cause one or more controllable devices to stop or reduce irrigation of the crop field.

21. The system of claim 20, wherein the two segments comprise a fast drainage segment and a segment corresponding to an ideal air and water availability in a root zone of the crop field.

22. A system for regulating plant irrigation at a crop field, the system comprising:
one or more monitoring sensors for obtaining soil water tension (SWT) data and/or soil water content (SWC) data at the crop field;
at least one processor communicatively couplable to the one or more monitoring sensors;
memory, communicatively couplable to the at least one processor, storing a plurality of executable instructions which, when executed by the at least one processor, cause the at least one processor to:
segment the SWT data and/or SWC data into two segments;
determine, for each of the two segments, a respective line of best fit;
determine an intercept between both lines of best fit;
store the intercept as an irrigation start threshold representative of a desired irrigation start point; and
in response to a determination that the SWT and/or SWC has reached the irrigation start threshold, cause one or more controllable devices to commence irrigation of the crop field.

23. The system of claim 22 wherein the two segments comprise a segment corresponding to an ideal air and water availability in a root zone of the crop field and a segment corresponding to insufficient water availability.

* * * * *